United States Patent
Stahr et al.

(10) Patent No.: US 10,994,717 B2
(45) Date of Patent: May 4, 2021

(54) SOLENOID VALVE AND HYDRAULIC BRAKING SYSTEM FOR A VEHICLE

(71) Applicant: Robert Bosch GmbH, Stuttgart (DE)

(72) Inventors: Wolf Stahr, Abstatt (DE);
Massimiliano Ambrosi, Abstatt (DE);
Michael Eisenlauer, Affalterbach (DE);
Edgar Kurz, Heilbronn-Horkheim (DE); Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 16/332,310

(22) PCT Filed: Sep. 20, 2017

(86) PCT No.: PCT/EP2017/073721
§ 371 (c)(1),
(2) Date: Mar. 11, 2019

(87) PCT Pub. No.: WO2018/069008
PCT Pub. Date: Apr. 19, 2018

(65) Prior Publication Data
US 2019/0210582 A1    Jul. 11, 2019

(30) Foreign Application Priority Data
Oct. 13, 2016 (DE) .................. 10 2016 219 939

(51) Int. Cl.
*F16K 31/06*    (2006.01)
*B60T 15/02*    (2006.01)
(Continued)

(52) U.S. Cl.
CPC ............ *B60T 15/028* (2013.01); *B60T 8/363* (2013.01); *B60T 13/62* (2013.01); *B60T 13/686* (2013.01);
(Continued)

(58) Field of Classification Search
CPC ........ B60T 8/364; B60T 8/3645; B60T 8/366; B60T 8/363; F16K 31/0655;
(Continued)

(56) References Cited

U.S. PATENT DOCUMENTS 3,290,631 A * 12/1966 Bedggood .............. H01H 50/32
335/168
5,573,224 A    11/1996 Kim
(Continued)

FOREIGN PATENT DOCUMENTS

DE    102013217106 A1 * 3/2015 ............ B60T 13/686

OTHER PUBLICATIONS

International Search Report corresponding to PCT Application No. PCT/EP2017/073721, dated Nov. 7, 2017 (German and English language document) (7 pages).

*Primary Examiner* — Bradley T King
*Assistant Examiner* — Stephen M Bowes
(74) *Attorney, Agent, or Firm* — Maginot, Moore & Beck LLP

(57) ABSTRACT

In a solenoid valve for a hydraulic braking system, a valve body has a receiving region which at least partially accommodates a guide assembly, the valve armature running axially through at least one through-opening of the guide assembly. A mechanical detent device is formed between the guide assembly and the valve armature, the detent device releasing the valve armature when the latter is in a de-energised closed position, such that the restoring spring drives the valve armature and pushes the closing element sealingly into the valve seat to produce a sealing function, and said detent device fixes the valve armature in a de-energised open position against the force of the restoring spring in an axial detent position, such that the closing element is raised from the valve seat.

9 Claims, 9 Drawing Sheets

(51) Int. Cl.
  *B60T 8/36* (2006.01)
  *F16K 31/56* (2006.01)
  *F16K 31/524* (2006.01)
  *B60T 13/62* (2006.01)
  *B60T 13/68* (2006.01)
  *F16K 31/00* (2006.01)
  *B60T 8/48* (2006.01)

(52) U.S. Cl.
  CPC ........ *F16K 31/003* (2013.01); *F16K 31/0655* (2013.01); *F16K 31/5245* (2013.01); *F16K 31/56* (2013.01); *B60T 8/4872* (2013.01); *B60T 2270/10* (2013.01); *B60T 2270/20* (2013.01); *B60T 2270/30* (2013.01); *B60T 2270/404* (2013.01)

(58) Field of Classification Search
  CPC .... F16K 31/52408; F16K 31/10; F16K 17/06; H01F 7/124; Y10T 137/7797; Y10T 137/7869; Y10T 137/7876; Y10T 137/7877; Y10T 137/7878; Y10T 137/7906
  USPC ........... 137/505.14, 517, 522, 523, 524, 530
  See application file for complete search history.

(56) References Cited

U.S. PATENT DOCUMENTS

| | | | |
|---|---|---|---|
| 5,599,003 A * | 2/1997 | Seemann | H01F 7/124 251/129.2 |
| 6,669,165 B2 | 12/2003 | Burke | |
| 6,776,391 B1 | 8/2004 | Goossens et al. | |
| 2009/0256093 A1* | 10/2009 | Chen | F16K 31/0675 251/129.15 |
| 2010/0301246 A1* | 12/2010 | Heyer | B60T 8/363 251/129.15 |
| 2011/0148552 A1* | 6/2011 | Tomimbang | H01F 7/124 335/21 |
| 2014/0042347 A1* | 2/2014 | Williams | F02C 7/232 251/129.02 |
| 2014/0264113 A1* | 9/2014 | Grover | F16K 31/52408 251/129.15 |
| 2019/0217840 A1* | 7/2019 | Stahr | B60T 13/686 |

\* cited by examiner

SOLENOID VALVE AND HYDRAULIC BRAKING SYSTEM FOR A VEHICLE

This application is a 35 U.S.C. § 371 National Stage Application of PCT/EP2017/073721, filed on Sep. 20, 2017, which claims the benefit of priority to Serial No. DE 10 2016 219 939.0, filed on Oct. 13, 2016 in Germany, the disclosures of which are incorporated herein by reference in their entirety.

The disclosure proceeds from a solenoid valve for a hydraulic brake system according to the generic type disclosed herein. The present disclosure also relates to a hydraulic brake system for a vehicle having a solenoid valve of said type.

BACKGROUND

The prior art has disclosed hydraulic brake systems for vehicles having a master brake cylinder, having a hydraulics unit and having multiple wheel brakes, which comprise various safety systems such as for example an anti-lock system (ABS), electronic stability program (ESP) etc., and which can perform various safety functions such as for example an anti-lock function, drive slip control (ASR) etc. By means of the hydraulics unit, open-loop and/or closed-loop control processes can be performed in the anti-lock system (ABS) or in the drive slip control system (ASR system) or in the electronic stability program system (ESP system) for the build-up of pressure or dissipation of pressure in the corresponding wheel brakes. To perform the open-loop and/or closed-loop control processes, the hydraulics unit comprises solenoid valves which are normally held in distinct positions owing to the oppositely acting forces "magnetic force", "spring force" and "hydraulic force". Accordingly, the valve types "open when electrically deenergized" and "closed when electrically deenergized" exist. These solenoid valves each comprise a solenoid assembly and a valve cartridge, which comprises a pole core, a guide sleeve connected to the pole core, an armature which is guided within the guide sleeve so as to be axially movable between a closed position and an open position counter to the force of a resetting spring and which has a plunger and has a closing element, and a valve sleeve which is connected to the guide sleeve and which has a valve seat. By means of the electrical energization of the solenoid assembly, a magnetic force is generated which, in the case of a solenoid valve which is open when electrically deenergized, moves the armature with the plunger and the closing element from the open position into the closed position, until the closing element abuts against the corresponding valve seat and seals off the latter. In the electrically deenergized state, the resetting spring moves the armature with the plunger and the closing element, and the closing element lifts off from the valve seat and opens up the latter. In the case of a solenoid valve which is closed when electrically deenergized, the electrical energization of the solenoid assembly causes the armature with the plunger and the closing element to be moved from the closed position into the open position, and the closing element lifts off from the valve seat and opens up the latter. If the electrical current is deactivated, then the resetting spring moves the solenoid armature with the closing element in the direction of the valve seat until the closing element abuts against the valve seat and seals off the latter. This electrical energization is associated with energy consumption, which is undesirable. Furthermore, the functional reliability or functional availability is not provided to the desired extent if the function is realized only by means of active electrical energization.

The laid-open specification DE 10 2007 051 557 A1 describes for example a solenoid valve, which is closed when electrically deenergized, for a slip-controlled hydraulic vehicle brake system. The solenoid valve comprises a hydraulic part, also referred to as valve cartridge, which is arranged partially in a stepped bore of a valve block, and an electrical part, which is formed substantially from a solenoid assembly which is fitted onto that part of the valve cartridge which projects out of the valve block. The solenoid assembly comprises a coil body with an electrical winding, a magnetic-flux-conducting coil casing, and a magnetic-flux-conducting ring-shaped disk. The hydraulic part has a guide sleeve, which at its end facing toward the electrical part is closed off by means of a pressed-in pole core which is welded in fluid-tight fashion. In the guide sleeve, there is received a longitudinally displaceable armature which is supported by means of a restoring spring on the pole core. The armature has, averted from the pole core, a spherical closing body which is arranged in a depression. At the end averted from the pole core, a pot-shaped valve sleeve with a cylindrical shell and a base is pressed into the guide sleeve. The valve sleeve has, on the base, a passage and a hollow conical valve seat which, with the closing body, forms a seat valve. By means of the seat valve, a fluidic connection between the passage on the base of the valve sleeve and at least one passage in the casing of the valve sleeve is configured to be switchable. Furthermore, on the outside of the shell of the valve sleeve, there is arranged a radial filter for filtering dirt particles out of the fluid flow. The guide sleeve may be calked in the stepped bore of the valve block by means of a fastening bushing.

EP 0 073 886 B1 has disclosed a hydraulic control unit with a control slide which is displaceable axially into multiple switching positions and which automatically returns into one of its switching positions by means of a resetting spring, which control slide, outside said switching position, can be fixed by means of a spring-loaded detent which engages into detent positions, which detent is furthermore hydraulically actuatable by means of a part which is guided as a piston in a housing bore and which can be acted on via an adjoining ring-shaped chamber with pressurized fluid. The ring-shaped chamber is connected via a pilot control valve to the pump pressure line that leads to the consumer, which pump pressure line is relieved of pressure when the one or more consumers are deactivated. Here, the hydraulic actuating travel of the detent is limited in relation to its actuating travel that is possible counter to spring force, and the detent locations on the control slide for the detent to engage into or behind are dimensioned radially such that, irrespective of the actuating travel that is possible counter to spring force, a hydraulic release of the detent is possible only at the detent positions provided for this.

SUMMARY

The solenoid valve for a hydraulic brake system having the features disclosed herein has the advantage that, in a solenoid valve with an electrically deenergized first operating state, a further electrically deenergized second operating state can be implemented. This means that embodiments of the present disclosure provide a bistable solenoid valve which can be switched between the two operating states as a result of application of a switching signal, wherein the solenoid valve remains permanently in the respective operating state until the next switching signal. Here, the first operating state may correspond to a closed position of the solenoid valve, and the second operating state may correspond to an open position of the solenoid valve. The switch between the two operating states may be performed for example by means of brief electrical energization of the active actuator of the solenoid assembly or by means of application of a switching signal or electrical current pulse to the solenoid assembly. With such a short electrical energization, the energy consumption can be advantageously reduced in relation to a conventional solenoid valve with two operating states, which has only one electrically deenergized first operating state and which, in order to implement the electrically energized second operating state, must be electrically energized for the duration of the second operating state. Furthermore, by contrast to embodiments of the present disclosure, the functional reliability or functional availability is not provided to the desired extent if the function can be realized only by means of active electrical energization.

Embodiments of the present disclosure provide a solenoid valve for a hydraulic brake system, having a solenoid assembly, having a pole core, having a guide sleeve connected to the pole core, having a valve armature which is guided in axially movable fashion within the guide sleeve and which can be driven counter to the force of a resetting spring by a magnet force generated by the solenoid assembly or can be driven by the force of the resetting spring and which axially moves a plunger with a closing element, and having a valve body which is connected to the guide sleeve and which has a valve seat which is arranged between at least one first flow opening and at least one second flow opening. The plunger is fixedly connected to the valve armature. Here, the valve body has a receiving region which at least partially receives a guide assembly, wherein the valve armature is guided axially in at least one passage opening of the guide assembly. A mechanical detent device is formed between the guide assembly and the valve armature, which mechanical detent device, in an electrically deenergized closed position, releases the valve armature such that the resetting spring drives the valve armature and pushes the closing element sealingly into the valve seat in order to perform a sealing function, and, in an electrically deenergized open position, fixes the valve armature, counter to the force of the resetting spring, in an axial detent position such that the closing element is lifted off from the valve seat. In the electrically deenergized closed position, the fluid flow between the at least one first flow opening and the at least one second flow opening is shut off, and in the electrically deenergized open position, the fluid flow between the at least one first flow opening and the at least one second flow opening is permitted.

Embodiments of the solenoid valve according to the disclosure advantageously exhibit very low leakage in the closed position and low energy consumption in the open position.

The hydraulic brake system for a vehicle having the features disclosed herein has the advantage that, with little additional outlay, it is possible in a commonly provided hydraulics unit with ESP functionality to realize an additional function which can electrohydraulically enclose a present brake pressure in the corresponding wheel brake and hold this over a relatively long period of time with little energy requirement. This means that the existing pressure supply, the pipelines from the hydraulics unit to the wheel brakes and sensor and communication signals can be used not only for the ESP function and/or ABS function and/or ASR function but also for an electrohydraulic pressure-holding function in the wheel brakes. In this way, it is advantageously possible for costs, structural space, weight and cabling to be saved, with the positive effect that the complexity of the brake system is reduced.

Advantageous improvements of the solenoid valve for a hydraulic brake system as herein are possible by means of the measures and refinements detailed in the disclosure.

It is particularly advantageous that the mechanical detent device is designed as a rotary cam mechanism which utilizes a circumferential force component in order to vary a rotational position between the valve armature with closing element and the guide assembly and in order to move the valve armature with closing element axially into the detent position and out of said detent position again, such that the valve armature with the closing element can easily switch between the two electrically deenergized positions as a result of application of a switching signal or electrical current pulse to the solenoid assembly. Proceeding from the electrically deenergized closed position, the valve armature with the closing element can switch from the electrically deenergized closed position into the electrically deenergized open position as a result of application of a switching signal. When a subsequent switching signal is applied, the valve armature with the closing element switches back from the electrically deenergized open position into the electrically deenergized closed position. Proceeding from the electrically deenergized open position, the valve armature with the closing element can switch from the electrically deenergized open position into the electrically deenergized closed position as a result of application of a switching signal. When a subsequent switching signal is applied, the valve armature with the closing element switches back from the electrically deenergized closed position into the electrically deenergized open position. Depending on the friction to be overcome, the guide assembly may rotate relative to the valve armature, and/or the valve armature may rotate relative to the arranged guide assembly, during the axial movement of the valve armature. In order to targetedly permit only the movement of one assembly, the guide assembly may be fastened rotationally fixedly in the valve body or the valve armature may be configured with a rotation prevention facility by means of positive locking with the guide sleeve or with the pole core.

In one advantageous refinement of the solenoid valve, the guide assembly may be mounted in rotationally movable or rotationally fixed fashion in the receiving region of the valve body. It is thus possible for the guide assembly to be guided for example between a support and a holding ring or in an undercut, which can define an axial position of the guide assembly.

In a further advantageous refinement of the solenoid valve, the guide assembly may comprise a control cage, which may have a first passage opening and a first guide geometry, and a control ring, which may have a second passage opening and a second guide geometry. The control cage and the control ring may for example each be formed as an individual part. Said individual parts may for example be produced as plastics parts in an injection molding process. Alternatively, the plastics parts may be produced by powder injection molding (PIM) or ceramic injection molding (CIM) or metal injection molding (MIM) etc. or by 3D printing. Furthermore, the control ring may be produced as a sheet-metal part in a punching and bending process. By virtue of the guide assembly being of multi-part form as plastics parts, the complex guide geometries can be produced easily and inexpensively as mass-produced parts and subsequently joined together. The control cage and the control ring may be connected rotationally fixedly to one another, wherein the control ring may be inserted into the control cage and at least one positioning lug formed on the control ring may be inserted into a corresponding positioning aperture formed on the control cage. Alternatively, the guide assembly with control cage and control ring may be formed in one piece, for example as a two-component plastics injection-molded part.

In a further advantageous refinement of the solenoid valve, the valve armature may have a stepped cylindrical main body with two different outer diameters, wherein a portion, which is guided in the at least one passage opening of the guide assembly, of the main body of the valve armature may have a third guide geometry which may interact with the first guide geometry of the control cage during an axial movement of the valve armature in the direction of the pole core and which may interact with the second guide geometry of the control ring during an axial movement of the valve armature in the direction of the valve seat, and which may generate a rotational movement of the valve armature and/or of the guide assembly about a common longitudinal axis. The valve armature may, by means of a portion of the main body arranged outside the guide assembly, be guided radially in rotationally movable fashion or with a rotation prevention action on an inner wall of the guide sleeve. Owing to the requirement for magnetic conductivity, the valve armature is produced from a magnetically conductive material, for example in a cold impacting process or by cutting. The pole core is likewise produced from a magnetically conductive material. The plunger may for example be produced as a plastics component in an injection molding process. Alternatively, the plunger may be produced by powder injection molding (PIM) or ceramic injection molding (CIM) or metal injection molding (MIM) etc. or by 3D printing. Furthermore, the plunger may, at its tip, be formed integrally as a closing element for the valve seat. Alternatively, the plunger may be of multi-part design and may for example have an additional sealing element, such as for example an O-ring seal, which is arranged in the region of the closing element and which improves the sealing action in the closed position. The plunger may for example be pressed into a corresponding receptacle in the main body of the valve armature.

In a further advantageous refinement of the solenoid valve, the first guide geometry may have a first encircling slotted guide with first apertures formed with a uniform angular pitch on a wall of the first passage opening, which first apertures are separated from one another by first separating webs on which there may be formed in each case one unilateral bevel. The second guide geometry may have a second encircling slotted guide with second apertures with different axial depths formed with a uniform angular pitch on a wall of the second passage opening, which second apertures are separated from one another by second separating webs on which there may be formed in each case one unilateral bevel. Here, the first separating webs may be arranged offset with respect to the second separating webs, wherein the third guide geometry may have at least one radially projecting positioning element. In the case of a rounded design of the at least one positioning element, the introduction of a rotational movement of the guide assembly and/or of the valve armature may advantageously be realized by means of tangential contact of the rounded positioning element on an oblique surface. In this way, in the case of the large number of switching processes that are to be expected in the vehicle, by contrast to other solutions which, for the function of the rotational indexing, involve relative rotation of axially preloaded pointed contours in contact with one another, abrasive wear on the functionally important parts can be avoided or at least reduced. Furthermore, in relation to other solutions, the switching process can be implemented with a relatively short axial actuating travel, which in the solenoid valve can have a positive effect on the attainable axial force by way of the reduced air gap. Alternatively, the at least one positioning element may have a polygonal, preferably triangular, cross section.

In a further advantageous refinement of the solenoid valve, during an axial movement, effected by magnetic force of the solenoid assembly, in the direction of the pole core, the valve armature may concomitantly drive the plunger and its closing element, wherein the at least one positioning element, proceeding from a position in a second aperture, may abut against a corresponding bevel of the control cage, whereby a circumferential force may act on the guide assembly and/or on the valve armature, and may rotate the guide assembly and/or the valve armature about a corresponding longitudinal axis until the at least one positioning element can slide, at the end of the bevel, into a corresponding first aperture. Here, during the axial movement, effected by the spring force of the resetting spring, of the valve armature in the direction of the valve seat, the at least one positioning element may abut, from the first aperture, against a corresponding bevel of the control ring, whereby a circumferential force may act on the guide assembly and/or on the valve armature and may rotate the guide assembly and/or the valve armature further about the corresponding longitudinal axis until the at least one positioning element can slide, at the end of the bevel, into a corresponding second aperture. Furthermore, in the electrically deenergized open position, the at least one positioning element may bear against a stop in a shallow second recess and, in the electrically deenergized closed position, be guided in a deep second recess until the closing element makes abutting contact in the valve seat. The maximum working stroke of the valve armature may for example be predefined by an air gap between pole core and valve armature or by the abutment of the valve armature against the pole core.

BRIEF DESCRIPTION OF THE DRAWINGS

Exemplary embodiments of the disclosure are illustrated in the drawing and will be discussed in more detail in the following description. In the drawing, the same reference designations denote components or elements which perform identical or analogous functions.

DETAILED DESCRIPTION

Figure 1:
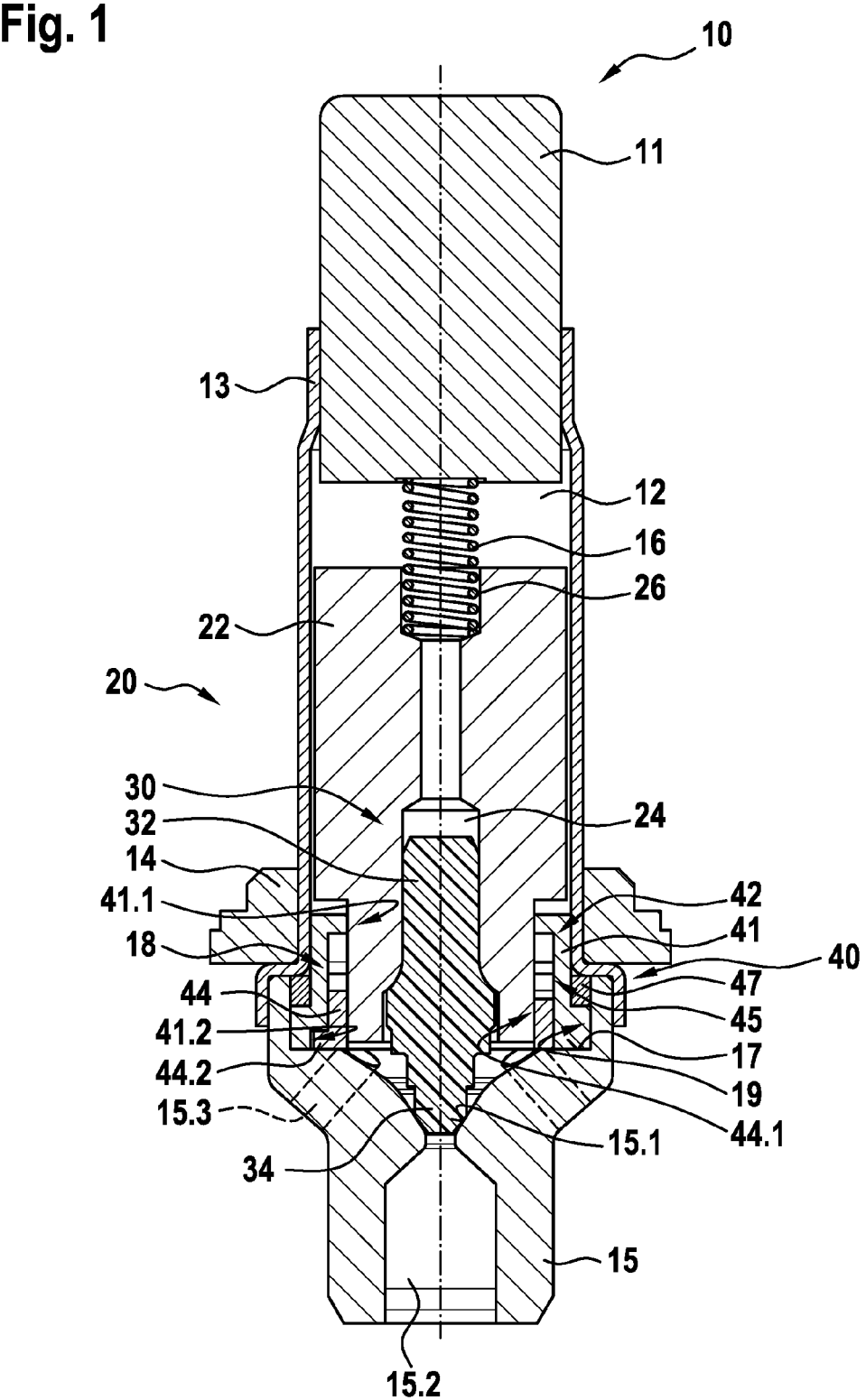
FIG. 1 is a schematic perspective sectional illustration of an exemplary embodiment of a solenoid valve according to the disclosure in its electrically deenergized closed position.

As can be seen from FIGS. 1 to 11, the illustrated exemplary embodiment of a solenoid valve 10 according to the disclosure for a hydraulic brake system 1 comprises a solenoid assembly (not illustrated in any more detail), a pole core 11, a guide sleeve 13 connected to the pole core 11, a valve armature 20 which is guided in axially movable fashion within the guide sleeve 13 and which can be driven counter to the force of a resetting spring 16 by a magnet force generated by the solenoid assembly or can be driven by the force of the resetting spring 16 and which axially moves a plunger 30 with a closing element 34, and a valve body 15 which is connected to the guide sleeve 13 and which has a valve seat 15.1 which is arranged between at least one first flow opening 15.2 and at least one second flow opening 15.3, wherein the plunger 30 is fixedly connected to the valve armature 20. Here, the valve body 15 has a receiving region 19 which at least partially receives a guide assembly 40. The valve armature 20 is guided axially in at least one passage opening 41.1, 44.1 of the guide assembly 40, wherein a mechanical detent device 18 is formed between the guide assembly 40 and the valve armature 20, which mechanical detent device, in an electrically deenergized closed position illustrated in FIG. 1, releases the valve armature 20 such that the resetting spring 16 drives the valve armature 20 and pushes the closing element 34 sealingly into the valve seat 15.1 in order to perform a sealing function and shuts off a fluid flow between the at least one first flow opening 15.2 and the at least one second flow opening 15.3, and, in an electrically deenergized open position illustrated in FIG. 11, fixes the valve armature 20, counter to the force of the resetting spring 16, in an axial detent position such that the closing element 34 is lifted off from the valve seat 15.1, and the fluid flow between the at least one first flow opening 15.2 and the at least one second flow opening 15.3 is permitted. In this way, a bistable solenoid valve 10 is implemented which can be switched between the two positions as a result of application of a switching signal, wherein the solenoid valve 10 remains permanently in the respective operating state until the next switching signal.

A bistable solenoid valve 10 of said type may be used for example in a hydraulic brake system 1 for a vehicle.

Figure 12:
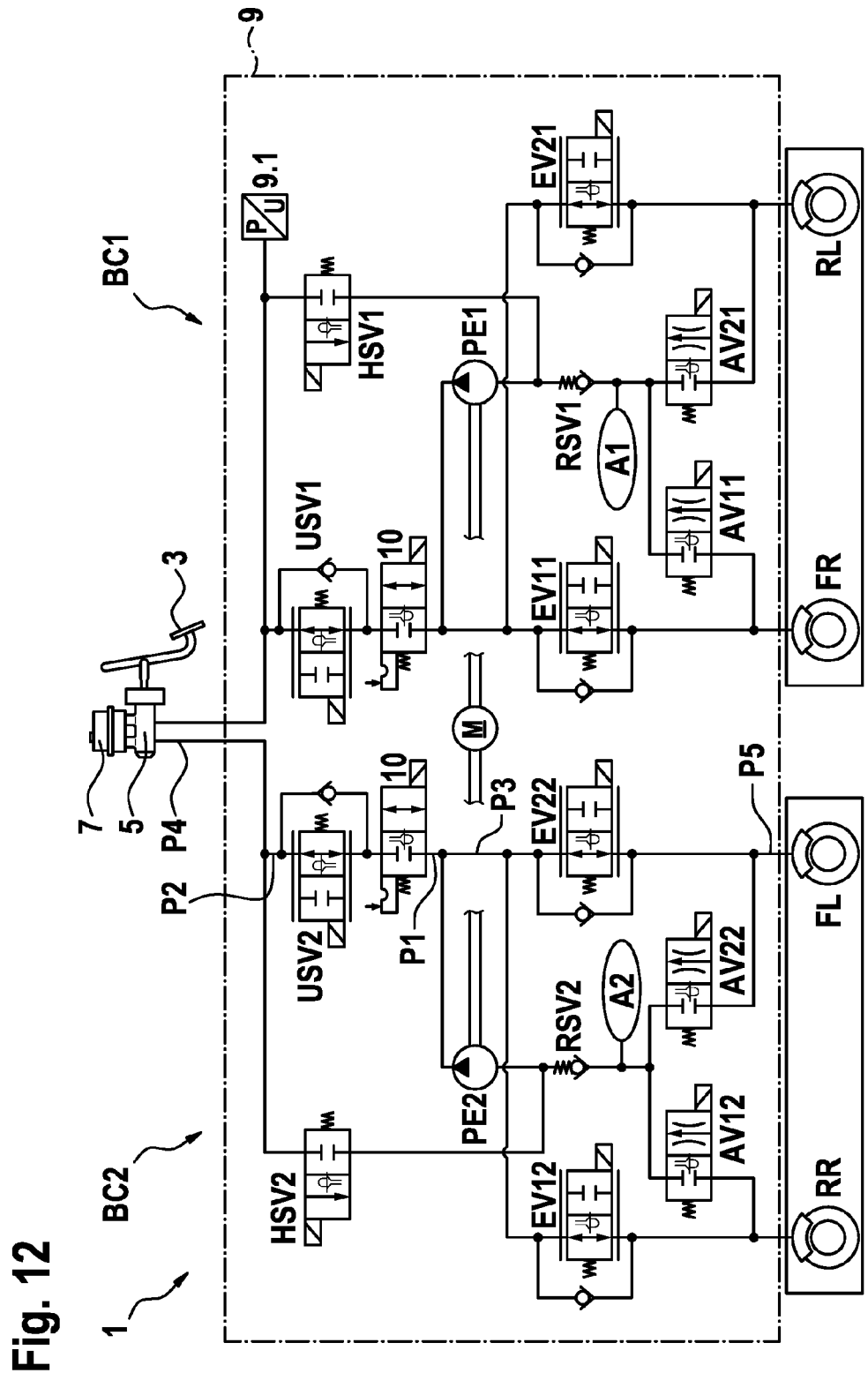
FIG. 12 shows a schematic hydraulic circuit diagram of an exemplary embodiment of a hydraulic brake system according to the disclosure for a vehicle.

As can be seen from FIG. 12, the illustrated exemplary embodiment of a hydraulic brake system 1 according to the disclosure for a vehicle, with which various safety functions can be implemented, comprises a master brake cylinder 5, a hydraulics unit 9 and multiple wheel brakes RR, FL, FR, RL. The hydraulics unit 9 comprises at least two brake circuits BC1, BC2 for brake pressure modulation in the wheel brakes RR, FL, FR, RL. Here, the at least two brake circuits BC1, BC2 each have a bistable solenoid valve 10 which has an electrically deenergized closed position and an electrically deenergized open position and which is switchable between the two positions, wherein the bistable solenoid valve 10, in the electrically deenergized open position, enables the brake pressure modulation in at least one associated wheel brake RR, FL, FR, RL and, in the electrically deenergized closed position, encloses a present brake pressure in the at least one associated wheel brake RR, FL, FR, RL.

As can also be seen from FIG. 12, the illustrated exemplary embodiment of the hydraulic brake system 1 comprises two brake circuits BC1, BC2, which are assigned in each case two of the four wheel brakes RR, FL, FR, RL. Thus, a first wheel brake FR, which is arranged for example on the right-hand side at a vehicle front axle, and a second wheel brake RL, which is arranged for example at the left-hand side at a vehicle rear axle, are assigned to a first brake circuit BC1. A third wheel brake RR, which is arranged for example at the right-hand side at a vehicle rear axle, and a fourth wheel brake FL, which is arranged for example at the left-hand side at the vehicle front axle, are assigned to a second brake circuit BC2. Each wheel brake RR, FL, FR, RL is assigned an inlet valve EV11, EV21, EV12, EV22 and an outlet valve AV11, AV21, AV12, AV22, wherein, via the inlet valves EV11, EV21, EV12, EV22, pressure can be built up in the corresponding wheel brake RR, FL, FR, RL in each case, and wherein, via the outlet valves AV11, AV21, AV12, AV22, pressure can be dissipated in the corresponding wheel brake RR, FL, FR, RL in each case. For the build-up of pressure in the respective wheel brake RR, FL, FR, RL, the corresponding inlet valve EV11, EV12, EV21, EV22 is opened and the corresponding outlet valve AV11, AV12, AV21, AV22 is closed. For the dissipation of pressure in the respective wheel brake RR, FL, FR, RL, the corresponding inlet valve EV11, EV21, EV12, EV22 is closed and the corresponding outlet valve AV11, AV21, AV12, AV22 is opened.

As can also be seen from FIG. 12, the first wheel brake FR is assigned a first inlet valve EV11 and a first outlet valve AV11, the second wheel brake RL is assigned a second inlet valve EV21 and a second outlet valve AV21, the third wheel brake RR is assigned a third inlet valve EV12 and a third outlet valve AV12, and the fourth wheel brake FL is assigned a fourth inlet valve EV22 and a fourth outlet valve AV22. By means of the inlet valves EV11, EV21, EV12, EV22 and the outlet valves AV11, AV21, AV12, AV22, open-loop and/or closed-loop control processes can be performed in order to implement an ABS function.

Furthermore, the first brake circuit BC1 has a first intake valve HSV1, a first system pressure setting valve USV1, a first expansion tank A1 with a first check valve RSV1, and a first fluid pump PE1. The second brake circuit BC2 has a second intake valve HSV2, a second system pressure setting valve USV2, a second expansion tank A2 with a second check valve RSV2, and a second fluid pump PE2, wherein the first and second fluid pumps PE1, PE2 are driven by a common electric motor M. Furthermore, the hydraulics unit 9 comprises a sensor unit 9.1 for determining the present system pressure or brake pressure. For the brake pressure modulation and to implement an ASR function and/or an ESP function, the hydraulics unit 9 uses the first system pressure setting valve USV1, the first intake valve HSV1 and the first return delivery pump PE1 in the first brake circuit BC1, and the second system pressure setting valve USV2, the second intake valve HSV2 and the second return delivery pump PE2 in the second brake circuit BC2. As can also be seen from FIG. 12, each brake circuit BC1, BC2 is connected to the master brake cylinder 5, which can be actuated by means of a brake pedal 3. Furthermore, a fluid tank 7 is connected to the master brake cylinder 5. The intake valves HSV1, HSV2 permit an intervention into the brake system without the presence of a driver demand. For this purpose, by means of the intake valves HSV1, HSV2, the respective suction path for the corresponding fluid pump PE1, PE2 to the master brake cylinder 5 is opened, such that said fluid pump instead of the driver can provide the pressure required for the closed-loop control. The system pressure setting valves USV1, USV2 are arranged between the master brake cylinder 5 and at least one associated wheel brake RR, FL, FR, RL and set the system pressure or brake pressure in the associated brake circuit BC1, BC2. As can also be seen from FIG. 12, a first system pressure setting valve USV1 sets the system pressure or brake pressure in the first brake circuit BC1 and a second system pressure setting valve USV2 sets the system pressure or brake pressure in the second brake circuit BC2.

As can also be seen from FIG. 12, the bistable solenoid valves 10 may be incorporated into the respective brake circuit BC1, BC2 at various positions P1, P2, P3, P4, P5. In the exemplary embodiments illustrated, the various positions P1, P2, P3, P4, P5 are indicated in each case in the second brake circuit BC2. As can also be seen from FIG. 12, the bistable solenoid valves 10 are incorporated into the respective brake circuit BC1, BC2 in each case at a first position P1 between the corresponding system pressure setting valve USV1, USV2 and the inlet valves EV11, EV12, EV21, EV22 upstream of an outlet channel of the corresponding fluid pump PE1, PE2. Alternatively, the bistable solenoid valves 10 may be incorporated into the respective brake circuit BC1, BC2 in each case at a second position P2 between the master brake cylinder 5 and the corresponding system pressure setting valve USV1, USV2, directly upstream of the corresponding system pressure setting valve USV1, USV2. As a further alternative arrangement, the bistable solenoid valves may be incorporated into the respective brake circuit BC1, BC2 in each case at a third position P3 between the corresponding system pressure setting valve USV1, USV2 and the inlet valves EV11, EV12, EV21, EV22 downstream of the outlet channel of the fluid pump PE1, PE2. Furthermore, in a further alternative arrangement, the bistable solenoid valves 10 may be incorporated into the respective brake circuit BC1, BC2 in each case at a fourth position P4 between the master brake cylinder 5 and the corresponding system pressure setting valve USV1, USV2 in the common fluid branch directly downstream of the master brake cylinder 5. Furthermore, the bistable solenoid valves 10 may be incorporated into the respective brake circuit BC1, BC2 in each case at a fifth position P5 directly upstream of an associated wheel brake RR, FL, FR, RL.

As can also be seen from FIG. 12, in the illustrated exemplary embodiment of the hydraulic brake system 1, an electrical energy store in the form of a vehicle on-board electrical system is used in order to keep the brake pressure which is enclosed in the at least one associated wheel brake RR, FL, FR, RL in the electrically deenergized closed position of the bistable solenoid valve 10 constant by replenishment delivery of brake fluid by means of the fluid pump PE1, PE2. Since electrical energy is required only for the switching of valves and for the brief replenishment delivery function, there is only a small additional electrical energy requirement for the brake pressure maintaining function. Alternatively, in an exemplary embodiment which is not illustrated, hydraulic accumulator devices may be used in order to keep the brake pressure which is enclosed in the at least one associated wheel brake RR, FL, FR, RL in the electrically deenergized closed position of the bistable solenoid valve 10 constant by replenishment delivery of brake fluid. Since electrical energy is required only for the switching of valves, but virtually no electrical energy is required for the replenishment delivery function, there is an even smaller electrical energy requirement for the brake pressure maintaining function owing to the hydraulic accumulator devices.

By means of the described measures, a compensation of any internal leakage and volume expansions which may arise for example owing to temperature changes is possible in an advantageous manner. Furthermore, the described measures may be combined. This means that the hydraulic accumulator device may be combined with the electrical accumulator device in order, in the electrically deenergized closed position of the bistable solenoid valve 10, to keep the brake pressure enclosed in the at least one associated wheel brake RR, FL, FR, RL constant over a relatively long period of time by replenishment delivery of brake fluid.

As can also be seen from FIGS. 1 to 11, the mechanical detent device 18 is designed as a rotary cam mechanism, which utilizes a circumferential force component in order to vary a rotational position between the valve armature 20 with closing element 34 and the guide assembly 40 and in order to move the valve armature 20 with closing element 34 axially into the detent position and out of said detent position again, such that the valve armature 20 with the closing element 34 can switch between the two electrically deenergized positions as a result of application of a switching signal to the solenoid assembly. In the exemplary embodiment illustrated, the guide assembly 40 is mounted in rotationally movable fashion between a support 17 and a holding ring 47 in the receiving region 19 of the valve body 15. Furthermore, the support 17 and the holding ring 47 define an axial position of the guide assembly 40. Here, after the insertion of the guide assembly 40 into the receiving region 19 of the valve body 15, the holding ring 47 is pressed into the valve body 15 such that the guide assembly 40 remains rotatable. Alternatively, the holding ring 47 may also be formed as a C-shaped clamping ring and may engage with detent action into an undercut in the valve body 15 such that the guide assembly 40 remains rotatable.

In the exemplary embodiment illustrated, the guide assembly 40 comprises a control cage 41, which has a first passage opening 41.1 and a first guide geometry 42, and a control ring 44, which has a second passage opening 44.1 and a second guide geometry 45. In the exemplary embodiment illustrated, the control cage 41 and the control ring 44 are each formed as plastics parts and are connected rotationally fixedly to one another. Here, the control ring 44 is inserted into the control cage 41, and three positioning lugs 44.2 formed on the control ring 44 are inserted into corresponding positioning apertures 41.2 formed on the control cage 41. It is self-evidently also possible for fewer or more than three positioning lugs 44.2 and positioning apertures 41.2 to be used in order to connect the control ring 44 rotationally fixedly to the control cage 41. Furthermore, in an alternative exemplary embodiment which is not illustrated, the control ring may be formed as a punched and bent sheet-metal part. Alternatively, the guide assembly 40 with control cage 41 and control ring 44 may be formed in one piece as a two-component plastics injection-molded part.

In the exemplary embodiment illustrated, the valve armature 20 has a stepped cylindrical main body 22 with two different outer diameters, wherein a portion, guided in the at least one passage opening 41.1, 44.1 of the guide assembly 40, of the main body 22 of the valve armature 20 has a third guide geometry 28 which interacts with the first guide geometry 42 of the control cage 40 during an axial movement of the valve armature 20 in the direction of the pole core 11 and which interacts with the second guide geometry 45 of the control ring 44 during an axial movement of the valve armature 20 in the direction of the valve seat 15.1 and which generates a rotational movement of the valve armature 20 and/of the guide assembly 40 about a common longitudinal axis. The valve armature 20 is, by means of a portion of the main body 22 arranged outside the guide assembly 40, guided radially on an inner wall of the guide sleeve 13. As can also be seen in particular from FIGS. 1 and 11, the main body 22 of the valve armature 20 has, on its end facing toward the valve seat 15.1, a depression 24 into which one end of the main body 32 of the plunger 30 is pressed. Formed at the other end of the main body 32 is the closing element 34, which forms the tip of the plunger 30 and which interacts with the valve seat 15.1 in order to perform the sealing function. In the exemplary embodiment illustrated, the plunger 30 is designed as a plastics injection-molded part. Alternatively, the plunger 30 may be produced in a PIM, CIM or MIM process or as a 3D-printed part. Furthermore, a sealing element may be arranged on the closing element 34 in order to improve the sealing action in the valve seat 15.1. The sealing element may for example be designed as an O-ring seal. At its end facing toward the pole core 11, the main body 22 of the valve armature 20 has a spring receptacle 26 which at least partially receives the resetting spring 16. The resetting spring 16 is supported at one end on a pole surface, facing toward the valve armature 20, of the pole core 11 and at the other end on a support in the spring receptacle 26. In an alternative embodiment which is not illustrated, the spring receptacle 26 may also be incorporated in the pole core 11, such that the resetting spring 16 is supported on that end surface of the valve armature 20 which faces toward the pole core 11 and in the spring receptacle 26. In the exemplary embodiment illustrated, the spring receptacle 26 is connected via an equalizing bore to the depression 24. An air gap 12 formed between the pole surface of the pole core 11 and a pole surface of the valve armature 20 predefines a maximum possible armature stroke.

Figure 2:
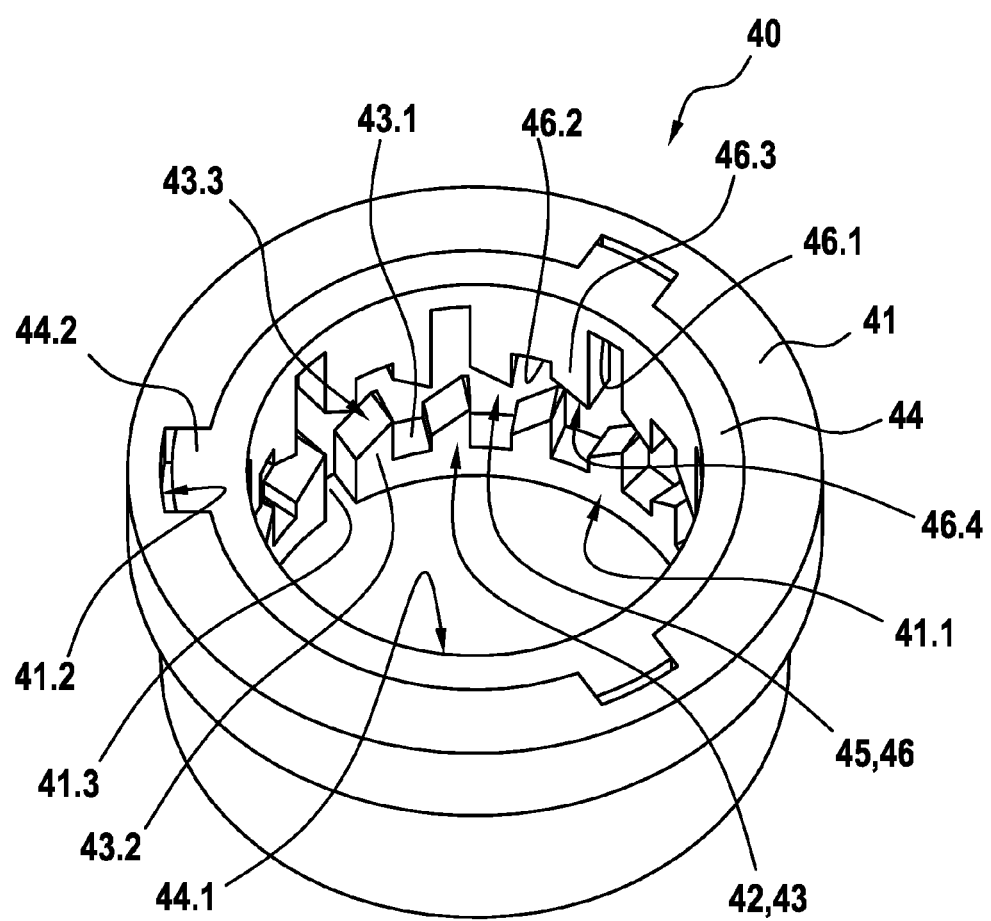
FIG. 2 is a schematic perspective illustration of an exemplary embodiment of a guide assembly for the solenoid valve from FIG. 1 from below.
Figure 3:
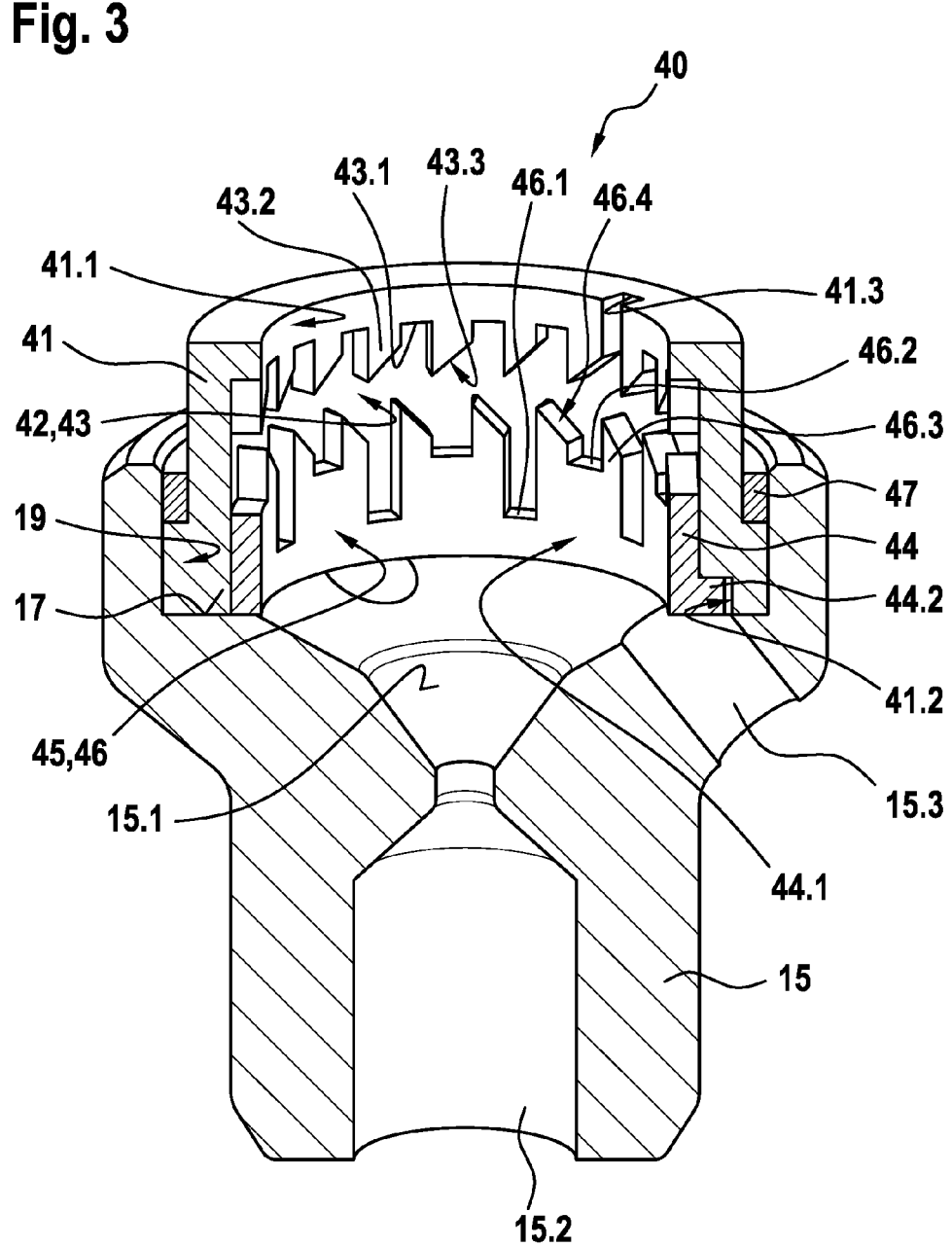
FIG. 3 is a schematic perspective partially sectional illustration of the guide assembly from FIG. 2 joined to a valve body of the solenoid valve from FIG. 1.
Figure 4:
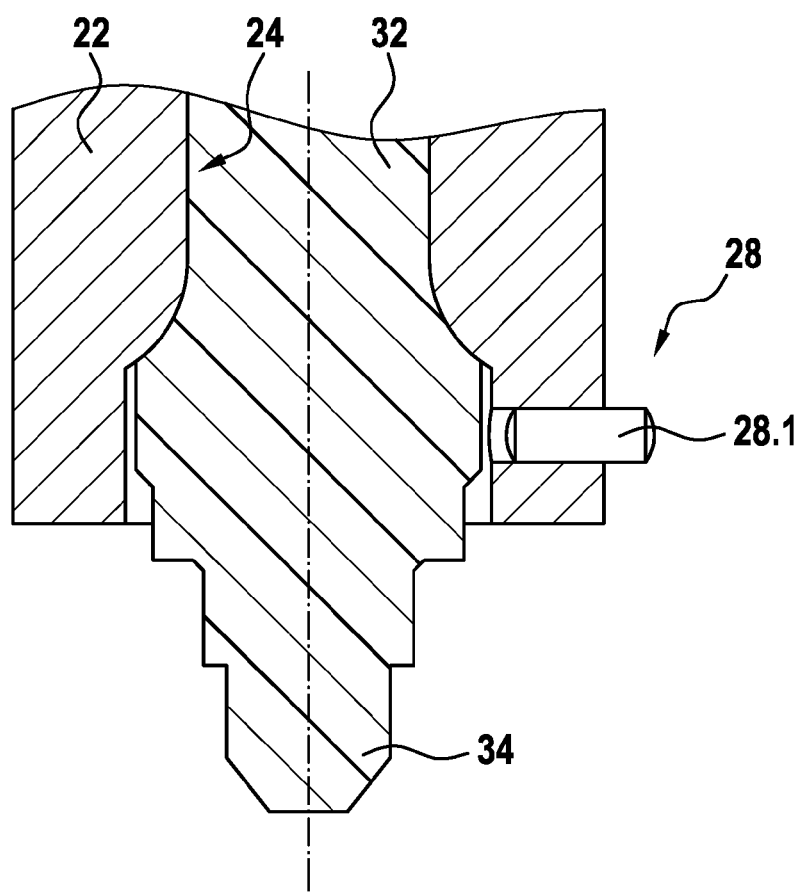
FIG. 4 is a schematic detail sectional illustration of an exemplary embodiment of a valve armature for the solenoid valve from FIG. 1.

As can also be seen in particular from FIGS. 2 and 3, the first guide geometry 42 has a first encircling slotted guide 43 with first apertures 43.1 formed with a uniform angular pitch on a wall of the first passage opening 41.1, which first apertures are separated from one another by first separating webs 43.2. In each case one unilateral bevel 43.3 is formed on the first separating webs 43.2. In the exemplary embodiment illustrated, eighteen first apertures 43.1 are formed with an angular pitch of 18×20° and a width of in each case 10° on the wall of the first passage opening 41.1. This means that the first separating webs 43.2 between the first apertures 43.1 likewise have a width of in each case 10°. The second guide geometry 45 has a second encircling slotted guide 46 with second apertures 46.1, 46.2 with different axial depths formed with a uniform angular pitch on a wall of the second passage opening 44.1, which second apertures are separated from one another by second separating webs 46.3. In each case one unilateral bevel 46.4 is formed on the second separating webs 46.3. In the exemplary embodiment illustrated, eighteen second apertures 46.1, 46.2 are formed with an angular pitch of 18×20° and a width of in each case 10° on the wall of the second passage opening 44.1. This means that the second separating webs 46.3 between the second apertures 46.1, 46.2 likewise have a width of in each case 10°. As can also be seen from FIGS. 2 and 3, the first separating webs 43.2 are arranged offset with respect to the second separating webs 46.3. In the exemplary embodiment illustrated, the offset between the first separating webs 43.2 and the second separating webs 46.3 is in each case 10°. In this way, the bevels 43.3 of the first separating webs 43.2 are arranged opposite the second apertures 46.1, 46.2, and the bevels 46.4 of the second separating webs 46.3 are arranged opposite the first apertures 43.1. As can be seen in particular from FIG. 4, in the exemplary embodiment illustrated, the third guide geometry 28 has a radially projecting rounded positioning element 28.1, which is pressed into a radial bore of the main body 22 of the valve armature 20. Alternatively, the positioning element 28.1 may be formed with a polygonal, preferably triangular, cross section, such that surfaces of the positioning element 28.1 are oriented parallel to the corresponding bevels 43.3 or bevels 46.4. Furthermore, the at least one positioning element 28.1 may alternatively be formed in one piece with the valve armature 20, such that the pressing-in process can be omitted. The positioning element 28.1 may, via an insertion aperture 41.3 arranged in the control cage 41, be inserted into the interior of the guide assembly 40 and interact with the first and second slotted guides 43, 46. The stated number of in each case eighteen first apertures 43.1 and second apertures 46.1, 46.2 is, like the angular pitch of 20° and the width of 10°, merely an example, and serves for easier explanation. Some other pitch over the 360° circumference is self-evidently possible.

Figure 11:
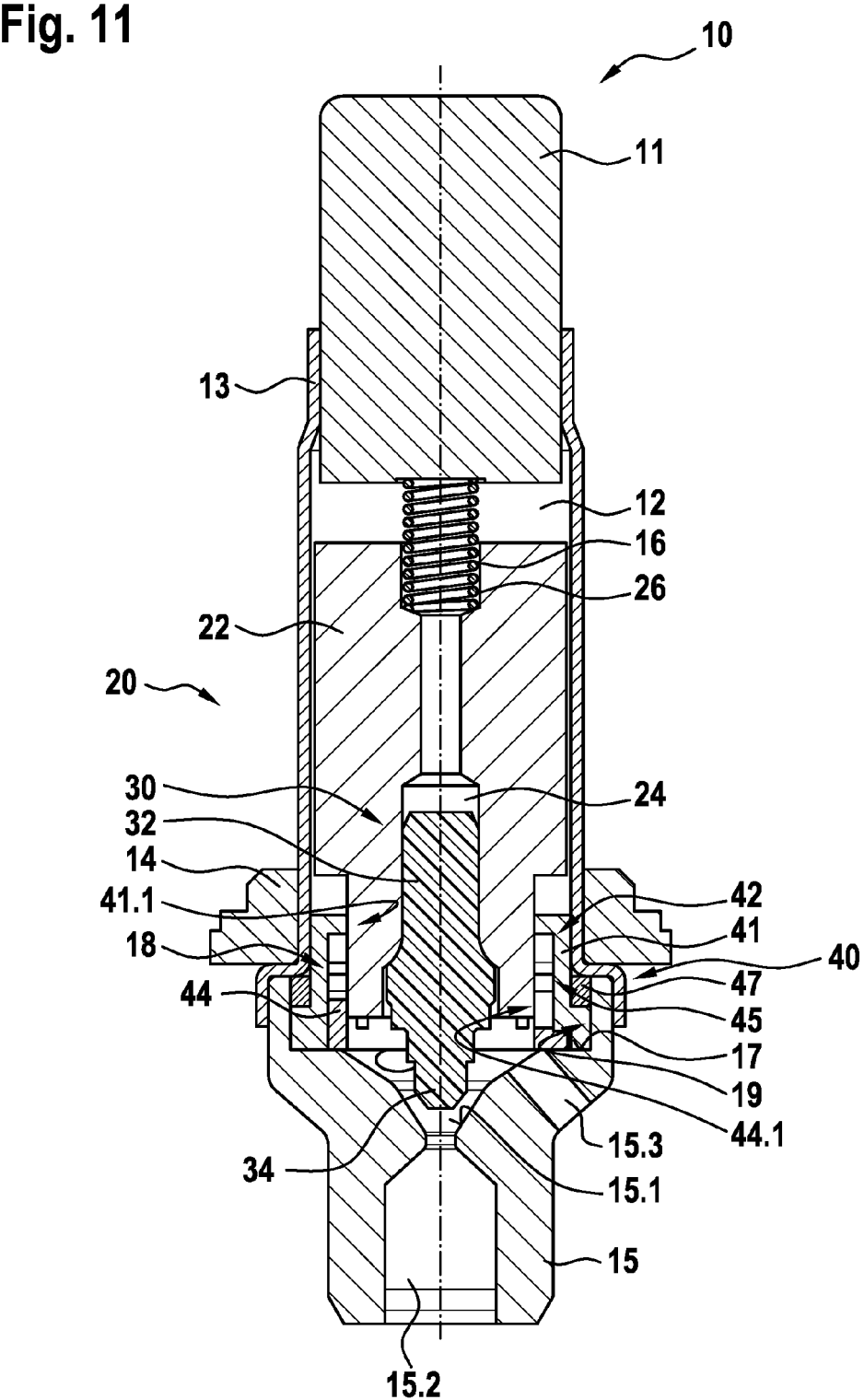
FIG. 11 is a schematic perspective sectional illustration of the solenoid valve from FIG. 1 in its electrically deenergized open position.

The movement sequence of the valve armature 20 with closing element 34 from the electrically deenergized closed position illustrated in FIG. 1 into the electrically deenergized open position illustrated in FIG. 11 will be described below with reference to FIGS. 5 to 10.

Figure 5:
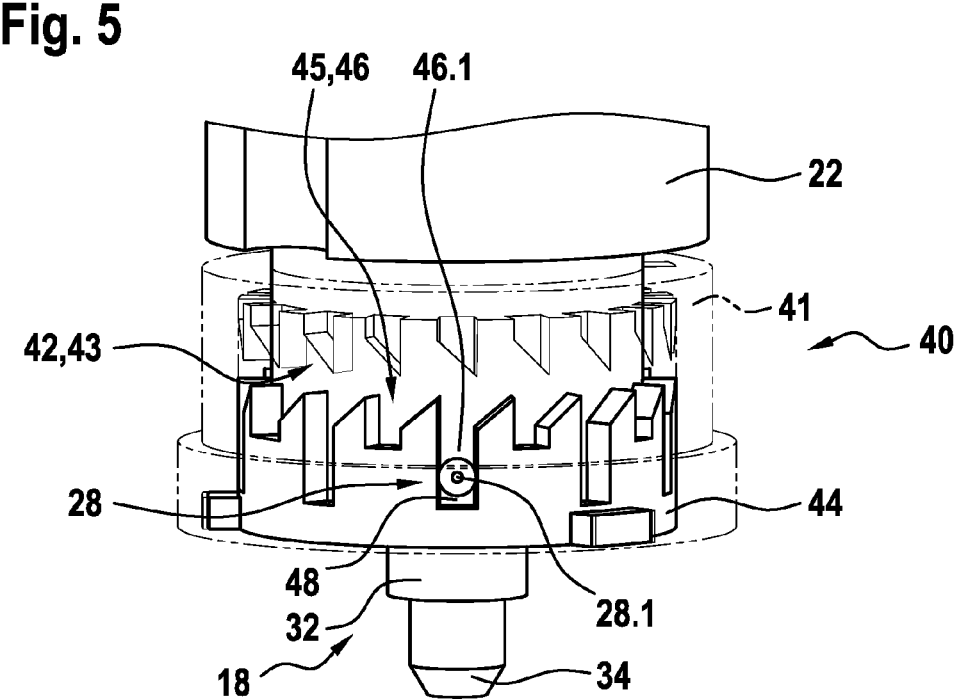
FIGS. 5 to 10 are in each case a schematic perspective illustration of an exemplary embodiment of a mechanical detent device for the solenoid valve from FIG. 1 in various positions.
Figure 6:
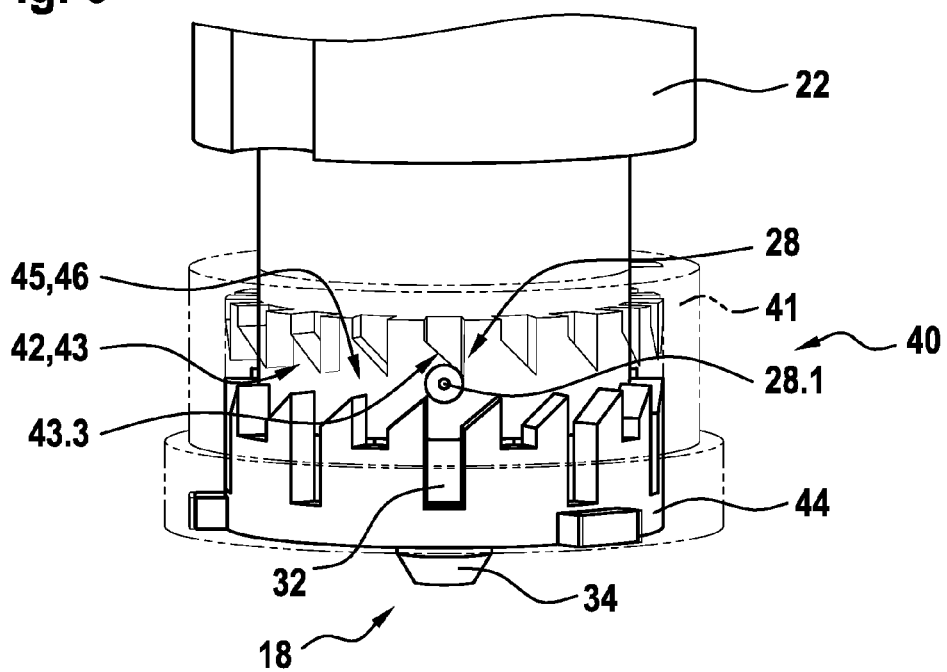
Figure 7:
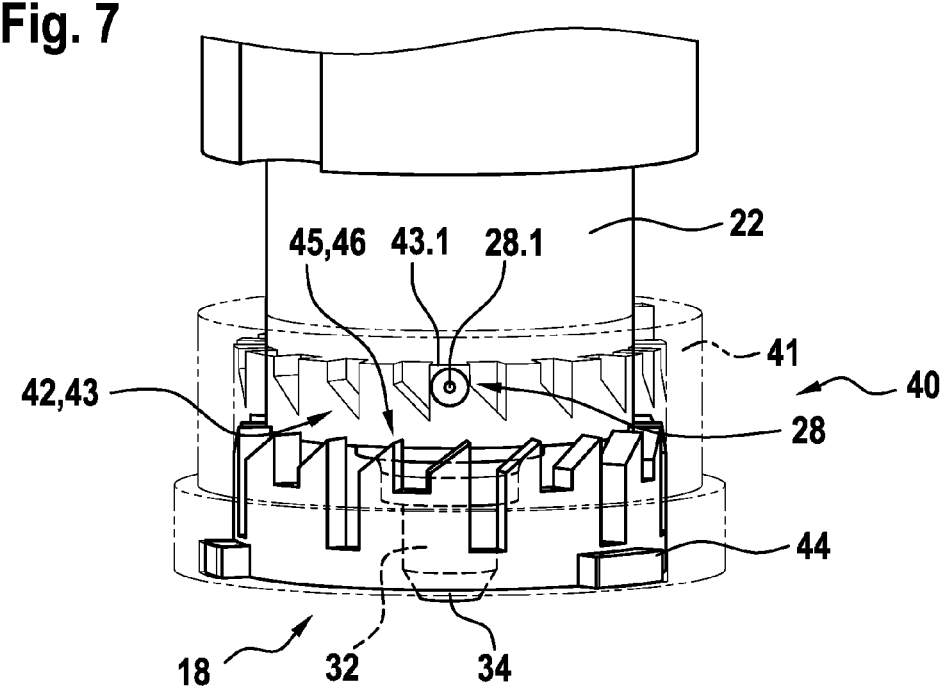
Figure 8:
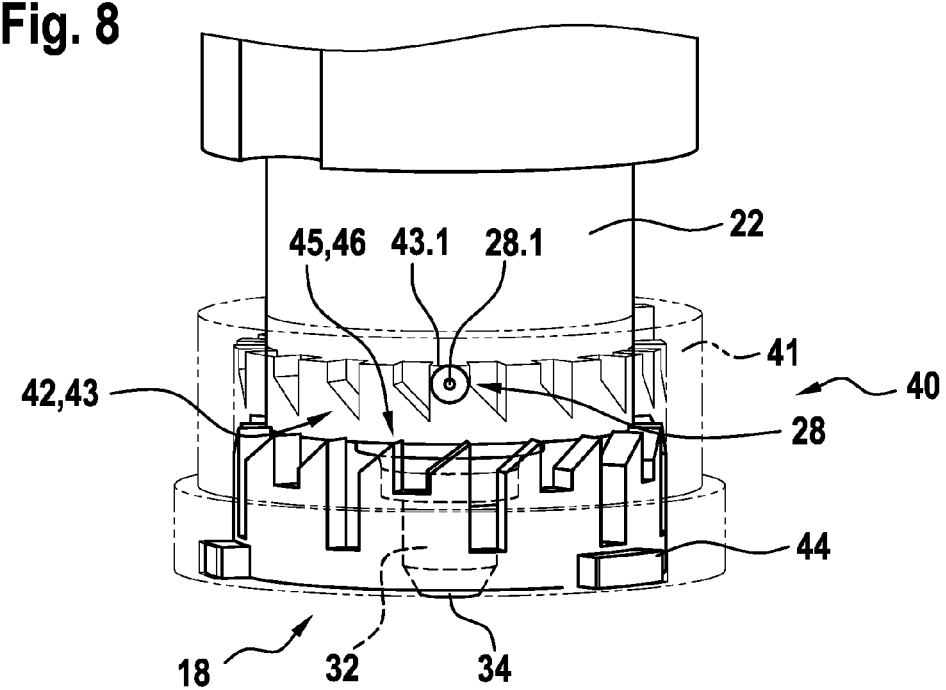
Figure 9:
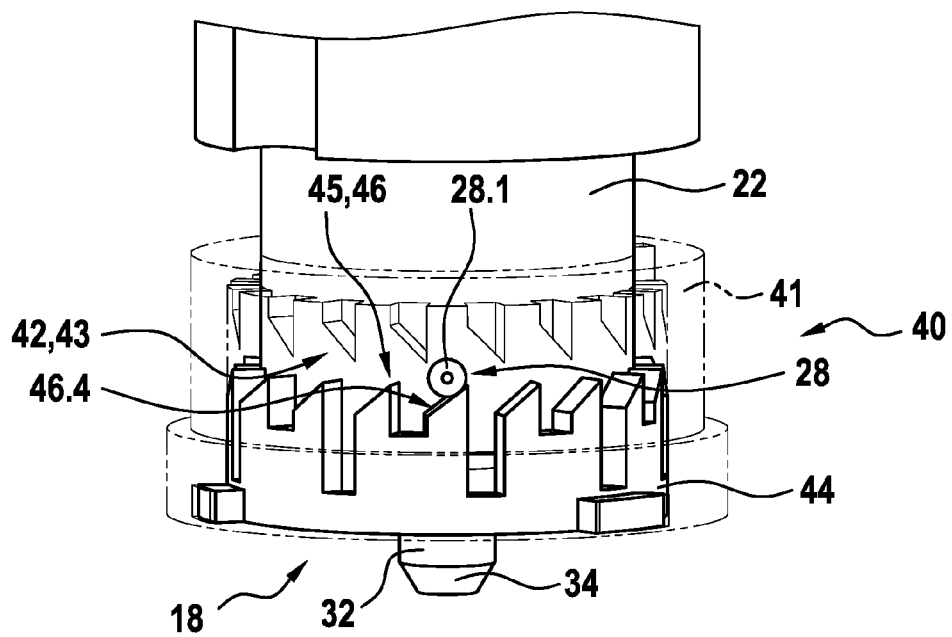
Figure 10:
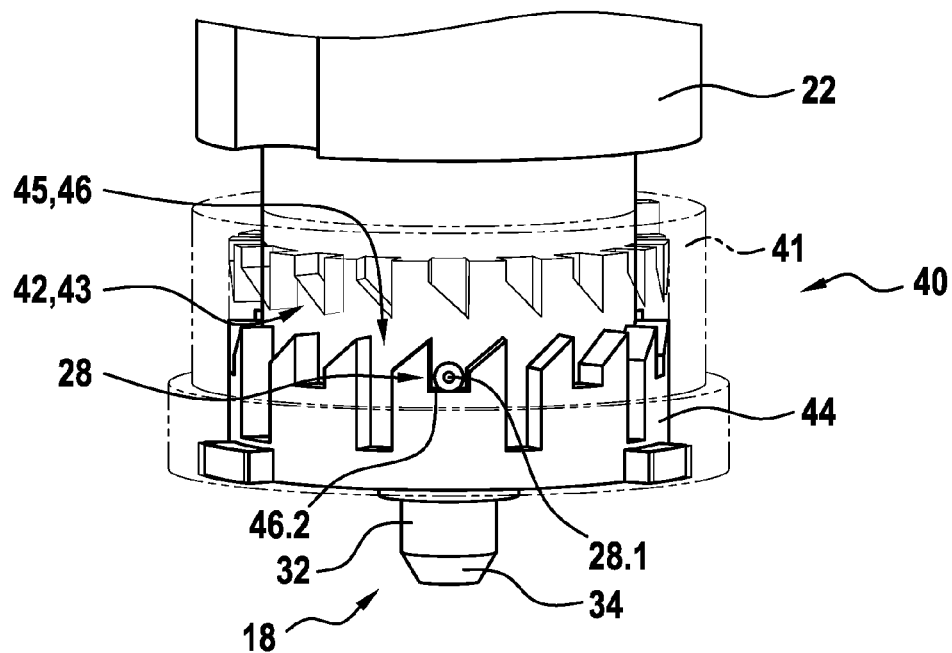

As can also be seen from FIG. 5, in the electrically deenergized closed position, the positioning element 28.1 is guided in a deep second aperture 46.1, and the closing element 34 makes sealing abutting contact in the valve seat 15.1, as can be seen from FIG. 1. An additional axial free space 48 between the positioning element 28.1 and the base of the deep second aperture 46.1 is advantageous for the compensation of length tolerances. In the exemplary embodiment illustrated, only one positioning element 28.1 is used. It is self-evidently also possible for multiple positioning elements 28.1 distributed over the circumference to be used in order to improve the guidance. As can also be seen from FIG. 6, during an axial movement, effected by magnetic force of the solenoid assembly, in the direction of the pole core 11, the valve armature 20 concomitantly drives the plunger 30 and its closing element 34, wherein the rounded positioning element 28.1, proceeding from the position in the deep second aperture 46.1, abuts tangentially against a corresponding bevel 43.3 of the control cage 41. FIG. 6 illustrates the moment during the upward movement of the valve armature 20 in which the rounded positioning element 28.1 makes contact with the bevel 43.3 of the control cage 41. In this way, a circumferential force acts on the guide assembly 40 and/or on the valve armature 20, and the guide assembly 40 and/or the valve armature 20 rotate about the corresponding longitudinal axis until the rounded positioning element 28.1 slides, at the end of the bevel 43.3, into a corresponding first aperture 43.1, as can be seen from FIG. 7, and reaches a predefined maximum axial stroke as illustrated in FIG. 8 and bears against the base of the first aperture 43.1. Alternatively, the spacing between the positioning element 28.1 and the base of the first aperture 43.1 may be selected such that the maximum working stroke is predefined by the abutment of the valve armature 20 against the pole core 11 or by the air gap 12 between the valve armature 20 and the pole core 11. After the deactivation of the magnetic force, the spring force of the resetting spring 16 effects the axial movement of the valve armature 20 in the direction of the valve seat 15.1. Here, the rounded positioning element 28.1 moves out of the first aperture 43.1 and abuts tangentially against a corresponding bevel 46.3 of the control ring 44, as can be seen from FIG. 9. FIG. 9 illustrates the moment during the downward movement of the valve armature 20 in which the rounded positioning element 28.1 makes contact with the bevel 46.4 of the control ring 44. In this way, a circumferential force acts on the guide assembly 40 and/or on the valve armature 20 and rotates the guide assembly 40 and/or the valve armature 20 further about the corresponding longitudinal axis until the rounded positioning element 28.1 slides, at the end of the bevel 46.3, into a corresponding shallow second aperture 46.2, as can be seen from FIG. 10. In the electrically deenergized open position that is now attained, the rounded positioning element 28.1 bears against a stop in the shallow second recess 46.2. Proceeding from the electrically deenergized open position illustrated in FIG. 10, the described principle is repeated upon the next electrical energization of the solenoid assembly, such that the electrically deenergized closed position is subsequently set.

In the solution described above, it is possible without functional disadvantage for both the guide assembly 40 and the valve armature 20, or both of these, to rotate depending on where less friction has to be overcome. In order to targetedly permit only the movement of one assembly, it is possible either for the guide assembly to be fastened fixedly rather than rotationally movably in the valve body 15, or for a rotation prevention facility to be provided for the valve armature 20. Such a rotation prevention facility may be implemented for example by means of positive locking of the valve armature 20 with the guide sleeve 13 or with the pole core 11.

The invention claimed is:

1. A solenoid valve for a hydraulic brake system, comprising:
   a solenoid assembly;
   a pole core;
   a guide sleeve connected to the pole core;
   a valve armature below the pole core which is guided in axially movable fashion by the guide sleeve and which is configured to be driven counter to a spring force of a resetting spring by a magnet force generated by the solenoid assembly or is configured to be driven by the spring force of the resetting spring, the valve armature configured to axially move a plunger with a closing element; and
   a valve body connected to the guide sleeve so that the valve body is below the armature, the valve body having a valve seat arranged between at least one first flow opening and at least one second flow opening,
   wherein the plunger is fixedly connected to the valve armature,
   wherein the valve body has a receiving region which at least partially receives a guide assembly,
   wherein the valve armature is guided axially in at least one passage opening of the guide assembly,
   wherein a mechanical detent device is arranged between the guide assembly and the valve armature, the mechanical detent device, in an electrically deenergized closed position of the solenoid valve, releases the valve armature such that the resetting spring drives the valve armature and pushes the closing element sealingly into the valve seat in order to perform a sealing function, and, in an electrically deenergized open position of the solenoid valve, fixes the valve armature, counter to the spring force of the resetting spring, in an axial detent position such that the closing element is lifted off from the valve seat,
   wherein the guide assembly has a control cage, which defines a first passage opening of the at least one passage opening and a first guide geometry, and a control ring, which defines a second passage opening of the at least one passage opening and a second guide geometry,
   wherein the control cage and the control ring are connected rotationally conjointly to one another, and
   wherein the control ring is inserted into the control cage, and at least one positioning lug formed on the control ring is inserted into a corresponding positioning aperture formed on the control cage.

2. The solenoid valve as claimed in claim 1, wherein the mechanical detent device is configured as a rotary cam mechanism having a circumferential force component that varies a rotational position between the valve armature with the closing element and the guide assembly and in order to move the valve armature with the closing element axially into the axial detent position and out of said axial detent position again, such that the valve armature with the closing element switches between the two electrically deenergized positions as a result of application of a switching signal to the solenoid assembly.

3. The solenoid valve as claimed in claim 1, wherein the guide assembly is mounted in rotationally movable or rotationally fixed fashion in the receiving region of the valve body.

4. The solenoid valve as claimed in claim 1, wherein the control cage and the control ring are each formed as individual parts, or the guide assembly is formed in one piece with control cage and control ring.

5. A solenoid valve for a hydraulic brake system, comprising:
   a solenoid assembly;
   a pole core;
   a guide sleeve connected to the pole core;
   a valve armature below the pole core which is guided in axially movable fashion by the guide sleeve and which is configured to be driven counter to a spring force of a resetting spring by a magnet force generated by the solenoid assembly or is configured to be driven by the spring force of the resetting spring, the valve armature configured to axially move a plunger with a closing element; and
   a valve body connected to the guide sleeve so that the valve body is below the armature, the valve body having a valve seat arranged between at least one first flow opening and at least one second flow opening,
   wherein the plunger is fixedly connected to the valve armature,
   wherein the valve body has a receiving region which at least partially receives a guide assembly,
   wherein the valve armature is guided axially in at least one passage opening of the guide assembly,
   wherein a mechanical detent device is arranged between the guide assembly and the valve armature, the mechanical detent device, in an electrically deenergized closed position of the solenoid valve, releases the valve armature such that the resetting spring drives the valve armature and pushes the closing element sealingly into the valve seat in order to perform a sealing function, and, in an electrically deenergized open position of the solenoid valve, fixes the valve armature, counter to the spring force of the resetting spring, in an axial detent position such that the closing element is lifted off from the valve seat, wherein the guide assembly has a control cage, which defines a first passage opening of the at least one passage opening and a first guide geometry, and a control ring, which defines a second passage opening of the at least one passage opening and a second guide geometry, wherein the valve armature has a stepped cylindrical main body with two different outer diameters, wherein a first portion of the main body of the valve armature is guided in the at least one passage opening and has a third guide geometry which interacts with the first guide geometry of the control cage during an axial movement of the valve armature in a direction toward the pole core and which interacts with the second guide geometry of the control ring during an axial movement of the valve armature in a direction toward the valve seat, the third geometry generating a rotational movement of at least one of the valve armature and the guide assembly about a common longitudinal axis, and wherein the valve armature is guided radially in rotationally movable fashion or with a rotation prevention action on an inner wall of the guide sleeve by a second portion of the main body that is arranged outside the guide assembly.

6. The solenoid valve as claimed in claim 5, wherein:
the first guide geometry has a first encircling slotted guide with first apertures formed with a first uniform angular pitch on a wall of the first passage opening, the first apertures being separated from one another by first separating webs, each first separating web having one first unilateral bevel,
the second guide geometry has a second encircling slotted guide with second apertures with different axial depths formed with a second uniform angular pitch on a wall of the second passage opening, the second apertures being separated from one another by second separating webs, each second separating web having one unilateral bevel,
the first separating webs are arranged offset with respect to the second separating webs, and
the third guide geometry has at least one radially projecting positioning element.

7. The solenoid valve as claimed in claim 6, wherein:
during axial movement effected by magnetic force of the solenoid assembly, in the direction toward the pole core, the valve armature concomitantly drives the plunger and the closing element, the at least one positioning element, proceeding from a position in a second aperture, abuts against a corresponding bevel of the control cage, whereby a circumferential force acts on the at least one of the guide assembly and the valve armature and rotates the at least one of the guide assembly and the valve armature about a corresponding longitudinal axis until the at least one positioning element slides, at the end of the bevel, into a corresponding first aperture,
during axial movement effected by the spring force of the resetting spring, of the valve armature in the direction toward the valve seat, the at least one positioning element abuts, from the first aperture, against a corresponding bevel of the control ring, whereby a circumferential force acts on the at least one of the guide assembly and the valve armature and rotates the at least one of the guide assembly and the valve armature further about the corresponding longitudinal axis until the at least one positioning element slides, at an end of the bevel, into a corresponding second aperture.

8. The solenoid valve as claimed in claim 7, wherein, in the electrically deenergized open position, the at least one positioning element bears against a stop in a shallow second recess and, in the electrically deenergized closed position, the at least one positioning element is guided in a deep second recess until the closing element makes abutting contact in the valve seat.

9. A hydraulic brake system for a vehicle, comprising:
a master brake cylinder;
a hydraulics unit; and
multiple wheel brakes,
wherein the hydraulics unit comprises at least two brake circuits for brake pressure modulation in the wheel brake,
wherein the at least two brake circuits each have at least one bistable solenoid valve that includes;
a solenoid assembly;
a pole core;
a guide sleeve connected to the pole core;
a valve armature below the pole core which is guided in axially movable fashion by the guide sleeve and which is configured to be driven counter to a spring force of a resetting spring by a magnet force generated by the solenoid assembly or is configured to be driven by the spring force of the resetting spring, the valve armature configured to axially move a plunger with a closing element; and
a valve body connected to the guide sleeve so that the valve body is below the armature, the valve body having a valve seat arranged between at least one first flow opening and at least one second flow opening,
wherein the plunger is fixedly connected to the valve armature,
wherein the valve body has a receiving region which at least partially receives a guide assembly,
wherein the valve armature is guided axially in at least one passage opening of the guide assembly,
wherein a mechanical detent device is arranged between the guide assembly and the valve armature, the mechanical detent device, in an electrically deenergized closed position of the solenoid valve, releases the valve armature such that the resetting spring drives the valve armature and pushes the closing element sealingly into the valve seat in order to perform a sealing function, and, in an electrically deenergized open position of the solenoid valve, fixes the valve armature, counter to the spring force of the resetting spring, in an axial detent position such that the closing element is lifted off from the valve seat, and
wherein in the electrically deenergized open position, the solenoid valve enables the brake pressure modulation in at least one associated wheel brake and, in the electrically deenergized closed position, the solenoid valve encloses a present brake pressure in the at least one associated wheel brake,
wherein the guide assembly has a control cage, which defines a first passage opening of the at least one passage opening and a first guide geometry, and a control ring, which defines a second passage opening of the at least one passage opening and a second guide geometry,
wherein the control cage and the control ring are connected rotationally conjointly to one another, and
wherein the control ring is inserted into the control cage, and at least one positioning lug formed on the control ring is inserted into a corresponding positioning aperture formed on the control cage.

\* \* \* \* \*